Sept. 12, 1967　　　L. W. NORMAN ET AL　　　3,340,690
BOUNDARY LAYER CONTROL FOR DETONATION RAMJETS
Original Filed March 13, 1961　　　2 Sheets-Sheet 2
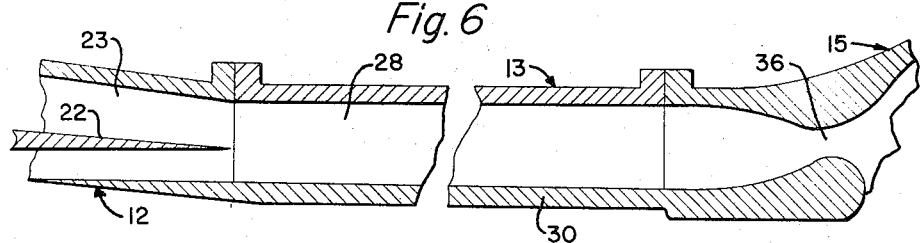
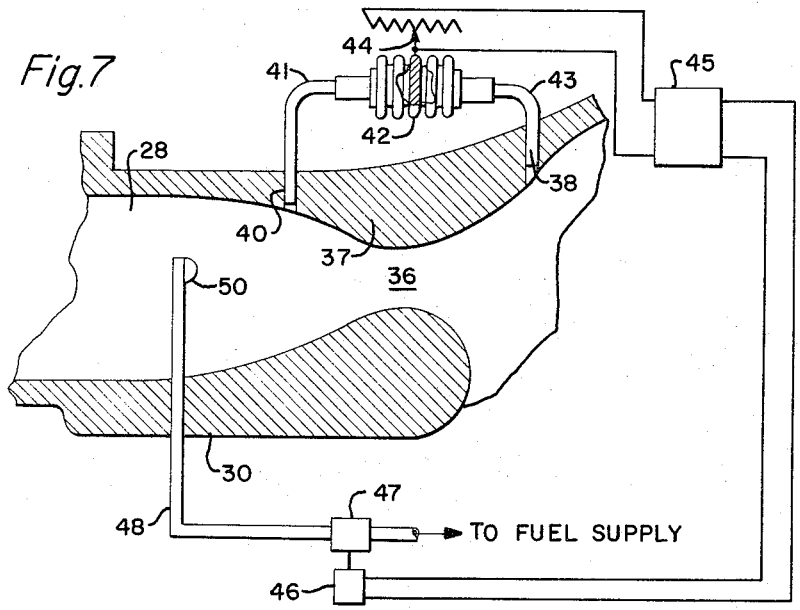
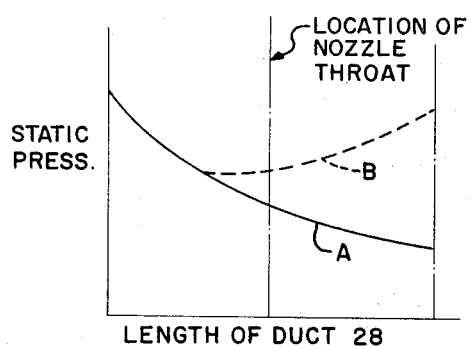
INVENTOR.
LESLIE W. NORMAN
SKILLMAN C. HUNTER
BY
Herschel C. Omohundro
ATTORNEY United States Patent Office 3,340,690
Patented Sept. 12, 1967

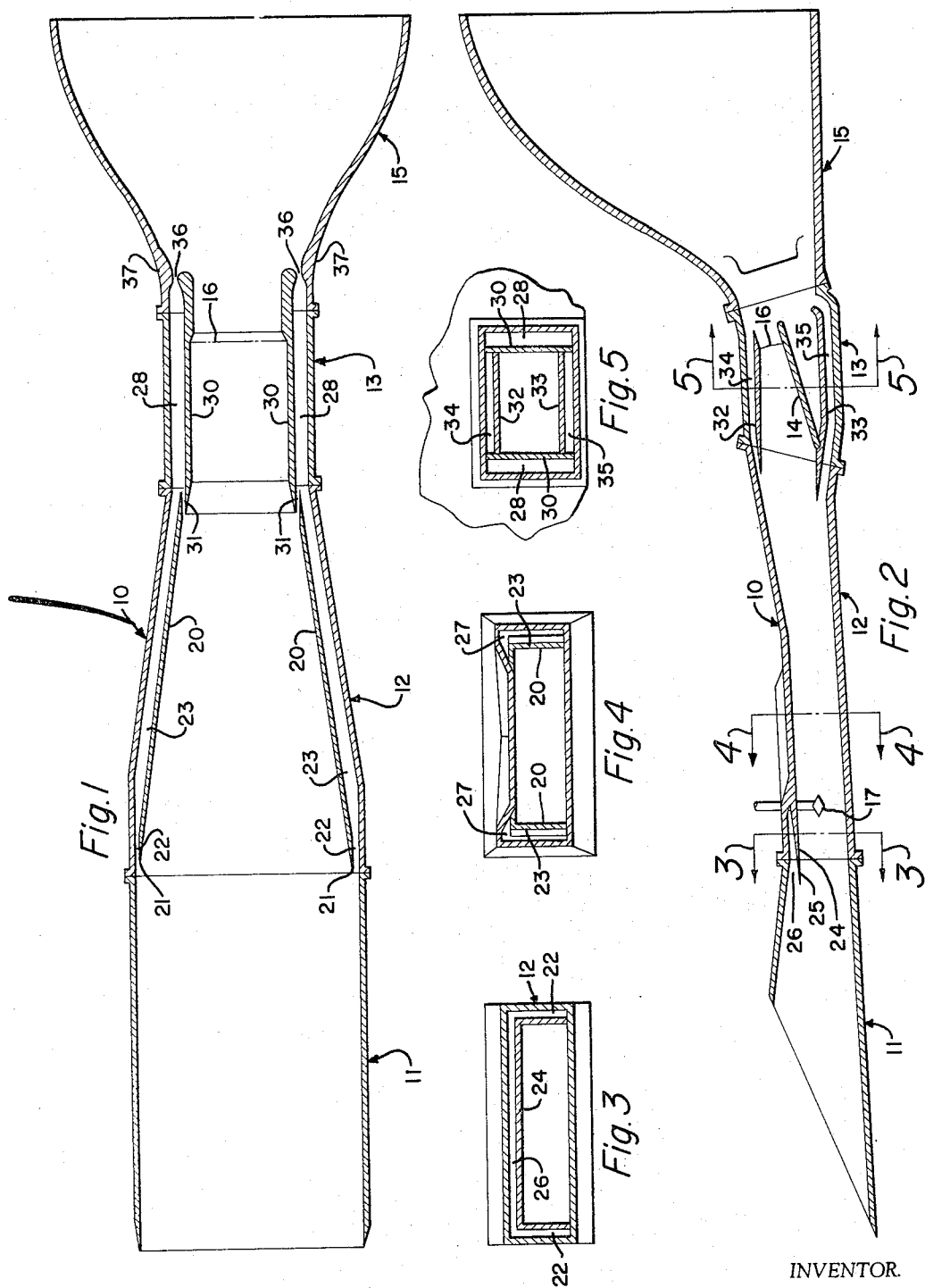

3,340,690
BOUNDARY LAYER CONTROL FOR
DETONATION RAMJETS
Leslie W. Norman, Scottsdale, and Skillman C. Hunter,
Phoenix, Ariz., assignors to The Garrett Corporation,
Los Angeles, Calif., a corporation of California
Continuation of application Ser. No. 95,086, Mar.
13, 1961. This application Oct. 4, 1963, Ser. No.
314,838
6 Claims. (Cl. 60—243)

The present application is a continuation of our application Ser. No. 95,086, filed Mar. 13, 1961, for Engines, which in turn was a continuation-in-part of the copending application Hunter and Norman Ser. No. 88,149, filed Feb. 9, 1961, and entitled, Method and Apparatus for Reaction Propulsion. Application Ser. No. 95,086 will be abandoned in favor of the present application.

This invention relates to air-breathing aircraft engines, and more particularly to a method of and means for controlling the boundary layers of the air flowing through a detonation combustion engine designed for use in a hypersonic aircraft.

In application Ser. No. 88,149 a detonation combustion engine is disclosed which is designed specifically for use in hypersonic aircraft. According to the Hunter and Norman application, the flame front or detonation is established and maintained in a variable geometry aerothermodynamic duct or engine by the temperature rise occurring across a shock wave, rather than being advanced by heat conduction as is the case in conventional internal combustion processes such as occur in ramjet and tubojet engines. Steady state detonation is established and maintained across a standing shock wave of fixed position relative to a confining structure therefor, and subsequent expansion of the gaseous detonation product is used to develop a continuous thrust.

It is well known that in passing air or other fluid through a duct or engine, boundary layers occur along the walls of the duct. A boundary layer is defined as the region of flow in a duct very near the duct wall, in which region there is a velocity gradient from mainstream velocity at the outer edge of the region or layer to zero velocity at the duct wall. Depending upon the size of the duct and the speed of the main fluid stream, the boundary layer flow may become unduly thick, turbulent, and sufficiently slow that the mainstream may be choked off completely. In addition, where the engine makes use of a shock wave system, the desired shock wave pattern becomes distorted and the operating efficiency of the engine is reduced. Since supersonic fluid streams are necessary to effect detonation combustion, the choking of the mainstream obviously would prevent detonation. The present invention is based on the discovery that in incorporating the principles of detonation combustion in a variable geometry hypersonic aircraft engine, it is possible to produce and maintain efficient detonation combustion in an engine of minimum cross-sectional area by bleeding off the boundary layers at a plurality of locations along the engine duct. The invention is further characterized by an arrangement of the bleed-off passages which makes it possible to provide a controlled addition of fuel to the bleed air so that such fuel-air mixture may then be used to obtain additional thrust.

It is therefore an object of this invention to provide a method and means for controlling the boundary layers in a detonation combustion engine.

Another object of this invention is to provide a method and means in a detonation combustion engine for effectively bleeding off and diverting the boundary layers of the airstream prior to detonation, and then directing the diverted air back into the mainstream in the exhaust nozzle, utilizing the low pressure in said nozzle as the driving force, suction, or pressure differential to draw off the bleed air.

It is another object of the invention to provide a method and means in a detonation engine for effectively bleeding off and diverting the boundary layers of the airstream prior to detonation, feeding fuel to the diverted air in quantities regulated according to the rate of flow of such diverted air, burning the fuel-air mixture, and expanding the products through converging-diverging nozzles for the production of thrust.

A further object of this invention is to provide a detonation combustion engine for use in hypersonic aircraft, said engine including an aerothermodynamic duct, and means adjacent the walls of said duct for bleeding off and diverting the boundary layers of the airstream at critical points along said duct and directing the diverted air back into the mainstream behind the detonation combustion zone.

Still another object of the invention is to provide a boundary layer bleed-off system for a detonation combustion engine, which system includes a passage in which flow may be measured so that fuel may be added thereto in proper quantities for subsequent combustion.

The above and other features and objects of the invention will become apparent from the following description and accompanying drawings, in which:

FIG. 1 is a horizontal sectional view of a detonation combustion engine embodying the principles of this invention;

FIG. 2 is a vertical sectional view of the engine shown in FIG. 1;

FIGS. 3, 4 and 5 are vertical sectional views taken along the lines 3—3, 4—4, and 5—5, respectively, of FIG. 2;

FIG. 6 is a somewhat enlarged horizontal sectional view of a portion of one of the boundary layer ducts shown in FIG. 1;

FIG. 1 is an enlarged detail sectional view, partly schematic, showing an arrangement for controlling fuel flow to the boundary layer duct; and FIG. 8 is a graph showing the relation of static pressure to duct length for the duct shown in FIG. 6.

As used herein, a "detonation" may be defined as a wave in which an exothermic chemical reaction takes place and which moves with supersonic velocity with respect to the undetonated reactant gas. Detonation is characterized by this supersonic propagation velocity and a large pressure and temperature increase across the wave. A detonation differs from a subsonic flame in that such a flame moves with subsonic velocity and its microscopic propagation mechanisms are fundamentally different. The supersonic combustion wave produces a strong detonation which is stable, steady, reproducible, and obtainable over a wide fuel-air ratio as long as the Mach number of the approach flow is greater than the Chapman-Jouguet Mach number for that fuel-air ratio. A chapman-Jouguet detonation is characterized by the fact that the flow immediately behind the wave is sonic, i.e., a Mach number of of one, and such a detonation represents the minimum supersonic propagation Mach number for a given fuel-air ratio.

Experiment has shown that detonation combustion takes place under the following conditions:

(1) A stream of gases is moving supersonically relative to the containment vessel or aerothermodynamic duct;

(2) The total temperature of the supersonic gas stream must exceed the detonation temperature of the gas stream;

(3) The gas stream consists of a mixture of some oxidizer, such as air, and unburned fuel, such as hydrogen; and (4) A shock system of such strength is generated at some point in the aerothermodynamic duct that the static temperature across the shock system is high enough to cause detonation.

This type of detonation can occur across a normal shock wave whence the Mach number downstream of the shock wave will be subsonic. The same phenomena may occur across an oblique shock wave as long as the static temperature downstream of the shock wave is sufficiently high to cause detonation.

In the copending application of Hunter and Norman above referred to, a hypersonic (Mach number above 5.0) aircraft is shown. During cruising, at an altitude of about 125,000 feet, the aircraft is powered by a detonation combustion engine, one form of which may be similar to that shown in the accompanying drawings. Referring particularly to FIGS. 1 and 2, it will be noted that the engine 10 comprises an elongated aerothermodynamic duct having an intake portion or inlet 11, an intermediate mixing and diffusing section 12, a combustor portion 13 having a hingedly adjustable ramp 14, and an exhaust nozzle 15. The design of the aircraft and the configuration of the engine are such that the desired system of shock waves is created. Thus, when the aircraft is cruising at the hypersonic speed of Mach 6.5, for example, the air entering the inlet of the engine will have been reduced in velocity from the freestream Mach number of 6.5 to about 5.5. The engine design further reduces the velocity of the air flowing through the duct to a Mach number of about 2.5 immediately above the hinged combustor ramp 14. The engine 10 depends for its operation on the continuous detonation of a fuel-air mixture due to the temperature rise across a standing shock wave 16. Fuel may be fed from a suitable supply tank in the aircraft (not shown) to a plurality of injection nozzles 17 suitably located in the duct in the mixing portion 12 (FIG. 2). The wave 16 is a normal shock wave which, together with detonation, further reduces the velocity of the combustion gases to a subsonic point of about Mach number 0.8 as they enter the exhaust nozzle. Here the design is such as to produce the desired conditions of thrust for propulsion of the aircraft at hypersonic speeds.

As mentioned above, flow of fluid through a duct, such as the aerothermodynamic duct or engine 10, causes the formation of boundary layers along the walls of the duct. According to this invention, a sufficient amount of the boundary layers is removed from the main fluid flow inside the duct and in such a manner that there is little interference with or distortion of the desired shock wave patterns, and the operating efficiency of the engine is maintained at an optimum point while maintaining the cross-sectional area of the duct at a minimum for the desired flight conditions. The duct or passage system for accomplishing the desired boundary layer removal will now be described.

Referring to FIGS. 1 to 4, boundary layer removal for the detonation combustion engine 10 first takes place at the entrance to the intermediate or mixing section 12 of the aerothermodynamic duct. Special walls 20 are provided adjacent the side walls of the duct 10 on each side of the mixing portion 12. These walls have relatively sharp leading edges 21 forming narrow inlet passages 22, in which the air passes through a normal shock, thereby becoming subsonic as it is led to first diversionary passages 23. It is desired to have such passages wider than the inlets so as to allow the diverted fluid to increase in pressure and reduce velocity as it flows downstream. Provision is also made for removing the top boundary layer which has been forming as the air passes along the underside of the air-frame before reaching the inlet 11. Thus, a specially shaped wall member 24 is positioned parallel to the top wall of the duct 10 and provided with a sharp leading edge 25 forming a transverse inlet 26 leading to bifurcated passages 27 which connect with or empty into the side passages 23, as shown in FIG. 4. In this way the passages 23 ultimately receive all of the boundary layer air bled or diverted from the airstream as it enters the mixing zone 12.

Such diverted boundary layer air is led into passages 28 which are formed by wall members 30 positioned parallel to but spaced from the side walls of the duct at the combustion zone. The leading edges of the walls 30 are angular, sharp and slightly spaced from the downstream edges of the walls 20 so as to form another set of inlet passages 31 through which additional boundary layer air at the sides of the duct passes, again effecting normal shock and becoming subsonic as it is diverted or bled into the passages 28. In order to allow for increase in pressure and further reduction in velocity of the diverted boundary air, said passages 28 are larger than the passages 23, and the diverted streams of air are specially handled to produce additional thrust, as will be described below.

In addition to diverting the boundary layers at the sides of the airstream, special wall or diverting members 32 and 33 are spaced from the top and bottom walls, respectively, of the combustor section 13 of the duct. These top and bottom diverting members are attached to the side walls 30 (FIG. 5) and form upper and lower passages 34 and 35, respectively, which empty into the detonation zone immediately downstream of the standing detonation wave 16. Such addition of the upper and lower layers of boundary air at this location in the engine will aid in alleviating the sudden expansion of the burned gases prior to their passage into the exhaust nozzle 15.

As mentioned above, the main flow of diverted boundary layer air is controlled in a way to provide additional thrust. The air entering passages 22 and 31 is decelerated and passes through a normal shock as it enters the passages or ducts 23 and 28 and then travels subsonically along the duct 28 until it passes through a converging-diverging nozzle 36 at the downstream or outlet end of each duct 28. Entrance ducts or passages 22 and 31, where the air flow is initially supersonic, and subsonic ducts 23 and 28 are oversized from the standpoint of bleed flow requirements; and the size of ducts 22 and 31 and nozzles 36 are designed to pass the maximum bleed air flow requirements which may occur at flight Mach numbers higher than 6.5 or the particular design point or angle of attack.

When the flow through the nozzle 36 is subsonic, the static pressure against the walls of the nozzle downstream of the minimum area or throat will be greater than when the flow through the minimum area is sonic and downstream of the throat of the nozzle is supersonic. This is indicated in curves A and B of FIG. 8 where curve B shows the pressure changes where the flow is subsonic throughout the length of the passage 28 and nozzle 36, and curve A shows the pressure conditions where the flow is supersonic downstream of the throat of nozzle 36. It is desired to maintain the flow substantially at a sonic rate through the nozzle throat by feeding fuel to the upstream side of the nozzle so that the diverted boundary layer fluid may be burned and used to provide additional thrust as it enters the exhaust nozzle 15. To accomplish this desirable result, one of the nozzle walls 37 is provided with an opening or passage 38 on the downstream side of the throat of nozzle 36 and an opening or passage 40 on the upstream side so as to sense the pressure differential across said throat. Opening 38 is connected by a conduit 43 to one side of a suitable pressure responsive diaphragm 42, and opening 40 is similarly connected to the opposite side of said diaphagm by a conduit 41. Movement of the diaphragm 42 is arranged to actuate a rheostat 44 so as to regulate the current fed from an amplifier and power source 45 to a motor 46 which is adapted to control the flow of a fuel, such as hydrogen, from a supply tank (not shown) through a control valve 47 and conduit 48 to suitable injector nozzles 50. The arrangement is such that if flow through the throat of the nozzle 36 is subsonic, the pressure on diaphragm 42 will move the rheostat 44 to call for the addition of fuel to the injectors 50. The burning of the fuel causes the flow at the nozzle to become sonic because of its higher temperature and subsequently lower density. Such fuel flow will continue until there is a change in condition due to a change in flight condition of the aircraft, and is arranged to reduce the fuel flow as the pressure approaches curve A when the velocity through the nozzle 36 increases to a supersonic rate.

Although an aerothermodynamic duct of rectangular cross section is shown and described herein, it will be understood that the principles of this invention are applicable to ducts of any shape, such as polygonal, circular or elliptical. Various other changes may be made in the construction and control method described above, and certain features may be employed without others, without departing from this invention or sacrificing any of its advantages.

We claim:

1. A method of controlling the boundary layers and preventing interference with the shock wave patterns in the aerothermodynamic duct of a detonation combustion engine having a detonation combustion zone between the inlet and exhaust of said duct, which method comprises:
   (a) passing an airstream at supersonic velocity into said duct;
   (b) diverting a major portion of the boundary layers of said airstream at a plurality of points throughout the length of said duct;
   (c) merging such diverted air into a larger stream of lower velocity;
   (d) feeding such larger stream back into the mainstream behind the detonation combustion zone;
   (e) comparing the fluid pressures in such larger stream of lower velocity and in the mainstream behind the detonation combustion zone; and
   (f) adding fuel to said larger stream for combustion therein in advance of the return to said mainstream in accordance with predetermined differences in the fluid pressures being compared.

2. A detonation combustion engine adapted for use with hypersonic aircraft, comprising:
   (a) an elongated rectangular duct having walls forming an inlet, a mixing section, a combustion section, and an exhaust;
   (b) first means associated with at least two of the walls of said duct in the mixing section thereof for forming passages into which boundary layer air may be diverted;
   (c) second means associated with at least two walls of said duct in the combustion section thereof for forming passages into which additional boundary layer air may be diverted, said first means being arranged so that the boundary layer air will be directed into the passages formed by said second means;
   (d) means for injecting fuel into the passages formed by said second means so that combustion may take place in said passages;
   (e) nozzle means associated with such combustion passages for increasing the velocity of the products of combustion and directing said products into the exhaust; and
   (f) means for controlling the amount of fuel injected into said passages according to differences in pressures at the upstream and downstream sides of said nozzle means so as to maintain the flow through said nozzle means at a predetermined rate.

3. A detonation combustion engine adapted for use with hypersonic aircraft, comprising:
   (a) an elongated rectangular duct having walls forming an inlet, a mixing section, a combustion section, and an exhaust;
   (b) first means associated with at least two of the walls of said duct in the mixing section thereof for forming passages into which boundary layer air may be diverted;
   (c) second means associated with at least two walls of said duct in the combustion section thereof for forming passages into which additional boundary layer air may be diverted, said first means being arranged so that the boundary layer air will be directed into the passages formed by said second means;
   (d) means for injecting fuel into the passages formed by said second means so that combustion may take place in said passages;
   (e) nozzle means associated with such combustion passages for increasing the velocity of the products of combustion and directing said products into the exhaust;
   (f) means for measuring the pressure differential across said nozzle; and
   (g) means operated by said last-mentioned means for controlling the injection of fuel to said passages to provide substantially sonic flow through said nozzle.

4. In a detonation combustion engine having an aerothermodynamic duct including an inlet, a combustion zone and an exhaust, a boundary layer control system, comprising:
   (a) a first means in said duct at a predetermined distance from said inlet for diverting boundary layer air;
   (b) a second means immediately upstream of said combustion zone for diverting additional boundary layer air;
   (c) means in said duct between said first and second boundary layer diverting means for injecting fuel into an airstream flowing through said duct;
   (d) boundary layer air passage means for receiving the air and fuel-air mixture diverted by said first and second means respectively and combining them into streams of lower velocity;
   (e) means for injecting additional fuel into the air in said boundary layer air passage means for combustion therein;
   (f) nozzle means between said boundary layer air passage means and said exhaust to direct the products of combustion in said boundary layer air passage means to said exhaust; and
   (g) means responsive to pressure differentials upstream and downstream of said nozzle means to control the injection of fuel into said boundary layer air passage.

5. In a detonation combustion engine having an aerothermodynamic duct including an inlet, a combustion zone and an exhaust, a boundary layer control system, comprising:
   (a) a first means in said duct at a predetermined distance from said inlet for diverting boundary layer air;
   (b) a second means immediately upstream of said combustion zone for diverting additional boundary layer air;
   (c) means in said duct between said first and second boundary layer diverting means for injecting fuel into an airstream flowing through said duct;
   (d) adjustable ramp means in said combustion zone for creating a planar detonation wave across said combustion zone;
   (e) boundary layer air passage means for receiving the air and fuel-air mixture diverted by said first and second means, respectively, and combining them into stream of lower velocity;
   (f) means for injecting additional fuel into the air in said boundary layer air passage means for combustion therein; and
   (g) nozzle means between said boundary layer air passage means and said exhaust to direct the products of combustion in said boundary layer air passage means to said exhaust.

6. A detonation combustion engine, comprising:
(a) an aerothermodynamic duct including an inlet section with certain walls converging, a mixing zone with converging walls, a combustion zone with at least one adjustable wall to form a variable area throat and an exhaust nozzle;
(b) boundary layer air control means having wall means spaced from said converging mixing zone walls to provide boundary layer air passages coextensive with said mixing zone, the spacing of the upstream edges of said boundary layer walls being less than the spacing of the rest of the walls to cause a diffusion of the boundary layer diverted;
(c) additional wall means spaced from the combustion zone walls to provide boundary layer air receiving passages at the sides of said combustion zone, the leading edges of the additional wall means being spaced from the trailing edges of said first-mentioned boundary layer walls to divert additional boundary layer air at the inlet end of said combustion zone, said additional wall means being spaced from said duct walls a greater distance than said first-mentioned boundary layer walls to reduce the velocity of said boundary layer air;
(d) means for injecting fuel into the boundary layer air receiving passages for mixture and combustion with the boundary layer air; and
(e) nozzle means at the ends of said boundary layer air passages to direct the products of combustion into said exhaust nozzle at an increased velocity.

References Cited

UNITED STATES PATENTS

| | | | |
|---|---|---|---|
| 2,850,873 | 9/1958 | Hausmann | 60—35.6 |
| 2,947,139 | 8/1960 | Hausmann | 60—35.6 |
| 3,040,516 | 6/1962 | Brees | 60—35.6 |

FOREIGN PATENTS 673,629  6/1952  Great Britain.

MARK NEWMAN, *Primary Examiner.*

D. HART, *Assistant Examiner.*